United States Patent Office 3,499,749
Patented Mar. 10, 1970

3,499,749
HERBICIDAL TRIAZINYL AZIDES
Erwin Nikles, Allschwil, and Ludwig Ebner, Stein, Aargau, Switzerland, assignors to Ciba Limited, Basel, Switzerland, a Swiss company
No Drawing. Original application Nov. 23, 1964, Ser. No. 413,296, now Patent No. 3,415,827, dated Dec. 10, 1968. Divided and this application Oct. 26, 1967, Ser. No. 705,239
Claims priority, application Switzerland, Nov. 26, 1963, 14,458/63; June 4, 1964, 7,326/64
Int. Cl. A01n 9/12; C07d 55/50
U.S. Cl. 71—93                                    10 Claims

ABSTRACT OF THE DISCLOSURE

There are provided novel herbicidal compositions which contain as the active principal thereof a compound of the formula,

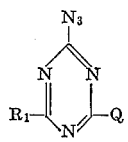

wherein $R_1$ is selected from the group consisting of

and $N_3$; wherein $A_1$ is lower alkyl, loweralkoxylower-alkyl wherein the alkyl moieties contain from 1 to 6 carbon atoms, and cyclohexyl, and $A_2$ is hydrogen and lower alkyl ($C_1$–$C_6$); and Q is selected from the group consisting of chloro, lower alkylthio, loweralkoxy and azido, wherein the loweralkyl moieties contain from 1 to 5 carbon atoms; provided that $R_1$ and Q are always different.

---

This application is a division of Ser. No. 413,296, filed Nov. 23, 1964, now U.S. Patent No. 3,415,827.

The present invention provides a pesticidal preparation, especially a herbicidal or microbicidal preparation, which comprises as active substance a compound of the general formula

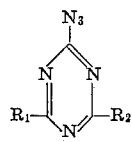

wherein $R_1$ represents a hydrogen atom, an aliphatic radical containing up to 18 carbon atoms, the group —CN, —SCN or —ZX (wherein Z stands for oxygen or sulfur and X for an unsubstituted or substituted aliphatic radical containing up to 18 carbon atoms, or a 5-membered to 7-membered, preferably a 6-membered cycloaliphatic radical), $R_2$ has the same meaning as $R_1$ or represents an azide radical, a halogen atom or the group

(wherein $A_1$ stands for an unsubstituted or substituted aliphatic radical containing up to 18 carbon atoms, a cycloaliphatic radical made up from 3 to 12 members, a lower alkoxyalkyl, hydroxyalkyl, cyanoalkyl or alkylthioalkyl radical and $A_2$ stands for a hydrogen atom or has the same meaning as $A_1$, or $A_1+A_2$ together with the nitrogen atom represent a 5-membered to 7-membered, preferably a 5-membered heterocyclic radical) together with a suitable carrier. There may also be present, in the preparations, one or more of the following additives: a solvent, a diluent, a dispersant, an adhesive and/or another pesticide, especially a herbicide and a fungicide.

The present invention provides especially those preparations of the kind defined above which contain as active substance a compound of the general formula

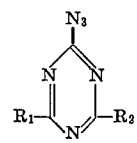 (II)

wherein $R_1$ represents a lower alkyl radical or the group —ZX (wherein Z stands for an oxygen or a sulfur atom and X for an unsaturated or saturated aliphatic hydrocarbon radical containing up to 8 carbon atoms, a lower alkoxyalkyl or chloralkyl radical or a 6-membered cycloaliphatic radical which may be substituted by lower alkylene or alkyl groups), $R_2$ has the same meaning as $R_1$ or represents a halogen atom, especially a fluorine, chlorine or bromine atom, an azide radical or the group

(wherein $A_1$ stands for an alkyl or alkenyl radical containing up to 18 carbon atoms, a cycloaliphatic 3- to 12-membered radical, a lower alkoxyalkyl, hydroxyalkyl, cyanoalkyl or alkylthioalkyl radical and $A_2$ for a hydrogen atom or a lower alkyl radical, or together with $A_1$ and the nitrogen atom stands for a 6-membered heterocyclic radical.

The preparations preferably contain, as active ingredient, those of the compounds referred to above that are represented by one of the following general formulae

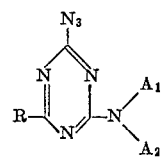 (III)

wherein $A_1$ represents an alkyl or alkenyl radical with up to 18 carbon atoms or a 3- to 12-membered cycloaliphatic radical or a lower alkoxyalkyl, hydroxyalkyl, cyanoalkyl or alkylthioalkyl radical, $A_2$ represents a hydrogen atom or a lower alkyl radical or, together with the nitrogen atom and $A_1$, represents the morpholino radical, and R represents a halogen atom, especially a chlorine, fluorine or bromine atom, a lower alkyl radical or the azide radical;

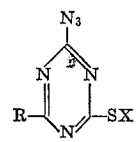 (IV)

wherein X represents an alkyl or alkenyl radical containing up to 5 carbon atoms, preferably the methyl group, and R stands for the group

wherein $A_1$ represents an alkyl or alkenyl radical containing up to 18 carbon atoms or a 3- to 12-membered cycloaliphatic radical, or a lower alkoxyalkyl, hydroxyalkyl, cyanoalkyl or alkylthioalkyl radical, $A_2$ represents a hydrogen atom or a lower alkyl radical or, together with $A_1$, the piperidino or morpholino radical; or wherein R represents an amide radical, a lower alkoxy radical, a halogen atom or the same radical as —SX.

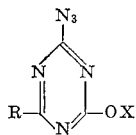 (V)

wherein X represents a saturated or unsaturated aliphatic hydrocarbon radical containing up to 8 carbon atoms, or a lower alkoxyalkyl or chloralkyl radical or a cyclohexyl radical or an alkylene-cyclohexyl-alkyl radical, and R represents the azide radical or the group

wherein $A_1$ stands for a saturated or unsaturated aliphatic hydrocarbon radical containing up to 8 carbon atoms, a lower alkoxyalkyl radical or a cyclohexyl radical, and $A_2$ for a hydrogen atom or a lower alkyl radical.

Preparations having a particularly good herbicidal effect are those containing the compounds of the following general formula

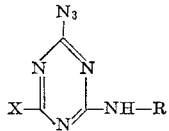 (VI)

wherein R represents a lower alkyl, a lower alkoxyalkyl or the cyclohexyl group, and X stands for a chlorine atom or the group $CH_3$—S— or $CH_3O$— or the azide radical. Among these compounds, the following are distinguished by their special potency:

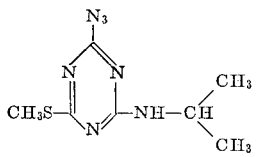

and

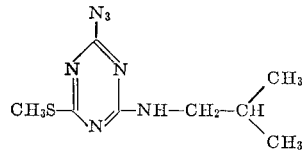

The new compounds of the general Formula I can be prepared by methods known per se, for example by reacting a compound of the general formula

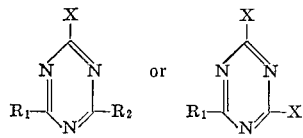

wherein $R_1$ and $R_2$ have the same meanings as in the above general Formula I and X represents a halogen atom or a quaternary ammonium group—with an alkali metal azide, for example $NaN_3$, preferably in a homogeneous or heterogeneous solvent phase, for example acetone+water, dioxane+water or dimethylformamide, with cooling or heating, preferably at a temperature ranging from —30° to 100° C.

If, in selecting a starting compound of the Formula III it is desired to carry out a selective substitution of the group X, a method known for the stepwise substitution in 1,3,5-triazine is employed (cf. Smolin et al., s-Triazines and Derivatives: Interscience Publishers, New York [1959]).

Another process for the manufacture of the active substances of the Formula I comprises reacting a compound of the formula

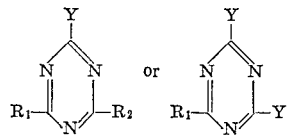

wherein $R_1$ and $R_2$ have the above meanings and Y stands stands for a hydrazino group, with nitrous acid or a nitrous acid donor. Particularly suitable nitrous acid donors are the salts of this acid, and this reaction is carried out in an aqueous, acid solution.

Furthermore, there may be used for this purpose an alkylnitrite for example ethylnitrite, butylnitrite or amylnitrite in an alcoholic solution.

The present invention further includes the use of the compounds of the above Formula I for combating pests, especially undesired plant growth, and harmful microorganisms for example bacteria and fungi, insects, for example *Musca domestica*, acarides for example spinner mites, nematodes and molluscs, for example land and water snails.

The invention further includes the use of the compounds of the above Formula I for defoliating cotton plants.

It is a special advantage of the active substances of the above Formula I and of the preparations containing these active substances that they may be used not only as total herbicides but, when used in a suitable concentration, also as selective herbicides. Thus, it is possible, for example, to combat successfully undesired plant growth in cultures of useful plants without appreciably damaging the latter.

The preparations of this invention may be applied in in a wide variety of forms. For manufacturing solutions of compounds of the general Formula I for direct spraying there may be used, for example, petroleum fractions of a medium to high boiling range, preferably above 100° C. for example diesel oil or kerosene, coal tar oils and oils of vegetable or animal origin, also hydrocarbons for example alkylated naphthalenes, tetrahydronaphthalene, if desired in combination with xylene mixtures, cyclohexanols, ketones, also chlorinated hydrocarbons for example trichloroethane, tetrachloroethane, trichloroethylene, trichlorobenzenes or tetrachlorobenzenes.

Aqueous forms of application are prepared, for example, by adding water to emulsion concentrates, pastes or wettable spray powders. Suitable emulsifiers or dispersants are, for example, nonionic products, such as condensation products of ethylene oxide with aliphatic alcohols, amines or carboxylic acid containing a long-chain hydrocarbon radical with about 10 to 20 carbon atoms, for example the condensation product of octadecyl alcohol with 25 to 30 mols of ethylene oxide, or of soybean fatty acid with 30 mols of ethylene oxide, or of commercial oleylamine with 15 mols of ethylene oxide, or of dodecylmercaptan with 12 mols of ethylene oxide. As examples of suitable anionic emulsifiers there may be mentioned the sodium salt of the dodecyl alcohol sulfuric acid ester, the sodium salt of the dodecylbenzenesulfonic acid, the potassium or triethanolamine salt of oleic acid or of abietic acid or of mixtures of these two acids, or the sodium salt of a petroleumsulfonic acid. Suitable catonic dispersants are quaternary ammonium compounds for example cetyl pyridinium bromide and dihydroxyethyl benzyl dodecyl ammonium chloride.

Dusting and casting preparations may contain as solid vehicles talcum, kaolin, bentonite, calcium carbonate or calcium phosphate, also coal, cork meal, wood meal and other materials of vegetable origin. It is also very advantageous to manufacture the preparations as granulates. The diverse forms of applications may contain the usual substances capable of improving the distribution, the adhesion, the stability towards rain or the penetration; as such substances there may be mentioned fatty acids, resin glue, casein and alginates.

The preparations of the invention may be used by themselves or in combination with conventional pesticides, especially insecticides, acaricides, nematocides, bactericides or further fungicides and/or herbicides.

Weeds that can be controlled with the preparations of this invention include also undesired culture plants, for example such as have been planted previously on the soil to be treated. The preparations may be used both by the pre-emergence and the post-emergence method The compounds of the general Formula I are also suitable for use as polymerization accelerators in the manufacture of synthetic resins, for example styrene radicals.

The present invention further includes the new compounds of the general Formula I as such as well as their manufacture.

The following examples illustrate the invention. Unless otherwise indicated, parts and percentages in the above description and in the following examples are by weight.

EXAMPLE 1

(1) 2 - ethylamino - 4 azido - 6 - chloro - 1,3,5 - triazine.—A solution of 12 parts of sodium azide in 100 parts of water was mixed dropwise with a solution of 19.6 parts of 2 - ethylamino - 4,6 - dichloro - 1,3,5 - triazine in 50 parts by volume of acetone while stirring vigorously, with the temperature of the suspension rising to 31° C. The mixture was stirred for 1 hour at this temperature and then filtered. The product was crystallized from alcohol; it melted at 97° to 98° C. The following compounds were manufactured in an analogous manner:

(2) 2 - azido - 4 - n - butylamino - 6 - chloro - 1,3,5-triazine, melting at 73–76° C. (hexane).

(3) 2 - azido - 4 - chloro - 6 - isobutylamino - 1,3,5-triazine, melting at 110° to 111° C., from cyclohexane, and (4) 2 - azido - 4 - secondary butylamino - 6 - chloro-1,3,5- - triazine, melting at 48° to 52° C., from hexane.—The 2,4 - dichloro - 6 - secondary butylamino - 1,3,5-triazine required as intermediate for the manufacture of compound No. 4 was prepared as described by J. T. Thurston et al., in J. Am. Chem. Soc. 73 p. 2981 [1951]. The product was extracted from the reaction mixture with chloroform and then distilled; it boils at 108° to 110° C. under 0.07 mm. Hg. pressure.

(5) 2 - azido - 4 - tertiary butylamino - 6 - chloro-1,3,5-triazine, melting at 73–76° C. (hexane).

(6) 2 - azido - 4 - fluoro - 6 - isobutylamino - 1,3,5-triazine.—While cooling a mixture of 135 parts of cyanuric fluoride and 1000 parts by volume of acetone with ice, 147 parts of isobutylamine were dropped in. On completion of the reaction the mixture was filtered, and the filtration evaporated, the residue taken up in 500 parts by volume of toluene and washed with ice water. The solution was dried with anhydrous sodium sulfate and evaporated. The resulting 2,4 - difluoro - 6 - isobutylamino - 1,3,5 - triazine was distilled under a high vacuum; it boiled at 90° to 92° C. under 0.2 mm. Hg pressure and melted at 41° to 43° C.

26 parts of 2,4 - difluoro - 6 - isobutylamino - 1,3,5-triazine were dissolved in 50 parts by volume of acetone and 10 parts of sodium azide and 10 parts of water were stirred in, while maintaining the temperature below 32° C. by cooling. The mixture was then stirred for 24 hours at room temperature, mixed with 200 parts of water, the precipitate formed was filtered off, dried and repeatedly recrystallized from hexane and cyclohexane. It melted at 100° to 103° C.

(7) 2 - azido-4-bromo-6-isobutylamino-1,3,5-triazine.—57.5 parts of isobutylamine were added dropwise at 0° C. to a suspension of 125 parts of cyanuric bromide in 400 parts by volume of acetone, and the mixture was then stirred for 4 hours at room temperature, filtered and the filtrate was evaporated. The residue was dissolved in 750 parts by volume of toluene and washed with ice water. The solution was dried over anhydrous sodium sulfate and evaporated. The resulting 2,4-dibromo-6-isobutylamino-1,3,5-triazine was crystallized from cyclohexane; it melted at 92° to 94° C.

46.5 parts of 2,4-dibromo-6-isobutylamino-1,3,5-triazine were dissolved in 60 parts by volume of acetone and 10 parts of sodium azide and 20 parts of water were stirred in. The mixture heated up to 41° C. and was then stirred for 24 hours at room temperature. The product was taken up in 200 parts by volume of toluene and washed with 2×100 parts of water. The solution was evaporated. The resulting 2-azido-4-bromo-6-isobutylamino-1,3,5-triazine was crystallized from petroleum ether; it melted at 83° to 87° C.

(8) 2 - amido - 4 - isopropylamino-6-methyl-1,3,5-triazine.—A solution of 41 parts of 2,4-dichloro-6-methyl-1,3-5,triazine in 400 parts by volume of acetone was mixed dropwise with 30 parts of isopropylamine, while cooling to maintain the temperature at about 25° C. The mixture was then further stirred for 5 hours at room temperature, filtered and evaporated. The residue was dissolved in 300 parts by volume of hexane. The solution was washed with ice water, dried over anhydrous sodium sulfate, filtered and evaporated. The resulting 2-chloro-4-isopropylamino-6-methyl-1,3,5-triazine was distilled; it boiled at 143° to 146° C. under 16 mm. Hg pressure and melted at 45° to 47° C.

A solution of 34.5 parts of 2-chloro-4-isopropylamino-6-methyl-1,3,5-triazine in 700 parts by volume of dry toluene was mixed at about 5° C. with 100 parts by volume of 4-molar toluolic trimethylamine solution. The mixture was kept for a few hours at 5° C. and then for 2 days at room temperature. The precipitated quaternary ammonium salt was filtered off and dried in a high vacuum at room temperature.

A solution of 24.6 parts of 6-(2-isopropylamino-4-methyl-1,3,5-triazinyl)-trimethyl ammonium chloride in 50 parts of water was mixed with 12 parts of sodium azide, and the mixture stirred for 3 hours at 50° C. and allowed to cool. The precipitate was filtered, washed with water, dried and crystallized from hexane. It melted at 71°–72° C.

(9) 2 - ethylamino - 4 - azido-6-methylmercapto-1,3,5-triazine.—A solution of 39.9 parts of 2,4-dichloro-6-methylmercapto-1,3,5-triazine in 120 parts by volume of dioxane was vigorously stirred dropwise at about 10° C. into a mixture of 13 parts of ethylamine of 70% strength and 200 parts of water. 100 parts by volume of 2 N-sodium hydroxide solution were then added portion-wise and the temperature allowed to rise to 20° C. When the sodium hydroxide solution was consumed, 20 parts of solid sodium azide were added and the emulsion stirred for 6 hours at about 75° C. The mixture was then cooled. The precipitated product was filtered off and washed with 2×100 parts of water, then crystallized from methanol, whereupon it melted at 114° to 116° C.

In an analogous manner the following compounds were manufactured from 2,4-dichloro-6-methylmercapto-1,3,5-triazine and the corresponding amines:

(10) 2 - azido - 4 - methylamino-6-methylmercapto-1,3,5-triazine, melting at 164° to 165° C. from alcohol;

(11) 2 - azido - 4 - methylmercapto-6-n-propylamino- 1,3,5-triazine, melting at 104° to 105° C. from methanol;

(12) 2 - azido - 4 - isopropylamino-6-methylmercapto-1,3,5-triazine, melting at 92° to 94° C. from cyclohexane;

(13) 2 - azido - 4 - n-butylamino-6-methylmercapto-1,3,5-triazine, melting at 93° to 95° C. from methanol.

(14) 2 - azido - isobutylamino - 6 - methylmercapto-1,3,5-triazine.—A solution of 196 parts of 2,4-dichloro-6-methylmercapto-1,3,5-triazine in 1000 parts by volume of benzene was mixed drop-wise with 146 parts of isobutylamine, while cooling externally to maintain a temperature below 20° C. The mixture was then stirred at room temperature until no more free amine could be identified and filtered. The filtrate was washed with ice water, dried over anhydrous sodium sulfate and evaporated, the residue being crystallized from hexane. The resulting 2-chloro - 4 - isobutylamino - 6 - methylmercapto - 1,3,5-triazine melted at 109° to 111° C.

A mixture of 30 parts of 2-chloro-4-isobutylamino-6-methylmercapto-1,3,5-triazine, 50 parts of sodium azide, 150 parts by volume of dioxane and 150 parts by volume of water was stirred for 24 hours at 80° C. The product was extracted with 300 parts by volume of toluene. The extract was washed with 2×100 parts of water, dried over anhydrous sodium sulfate and evaporated. The resulting 2 - azido - 4 - isobutylamino-6-methylmercapto-1,3,5-triazine melted at 102° to 103° C., and after crystallization from cyclohexane at 102° to 104° C.

In an analogous manner, the compounds listed in the following table were manufactured, using as starting material 2-alkylmercapto-4,6-dichloro-1,3,5-triazines:

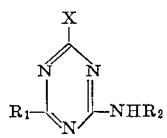

stirred dropwise at —5° to 0° C. into a solution of 55 parts of trimethylamine in 500 parts by volume of anhydrous toluene, whereupon the mixture was further stirred for 14 hours at about 20° C. The resulting quaternary salt was filtered off, washed with toluene and dried in a high vacuum at room temperature.

(23)(c) 2-azido-4-secondary butylmercapto - 6 - isopropylamino-1,3,5-triazine.—20 parts of 6-(2-secondary butylmercapto-4-isopropylamino-triazinyl) - trimethyl ammonium chloride were dissolved at room temperature in 50 parts of water, 17 parts of solid sodium azide were stirred in and the whole was heated for a short time at about 60° C. 100 parts by volume of benzene and 100 parts of water were then added, the aqueous phase was separated and the benzolic solution dried over anhydrous sodium sulfate, filtered and evaporated. The residue was freed in a high vacuum at room temperature from the last remanents of solvent, to yield pure 2-azido-4-secondary butylmercapto-6-isopropylamino-1,3,5-triazine as a viscous oil.

In an analogous manner, using as starting materials 2-alkylmercapto-4,6-dichloro - 1,3,5 - triazines, the following compounds were manufactured (the compounds obtained in crystalline form on reaction with sodium azide were filtered off, washed with water, dried and recrystalized).

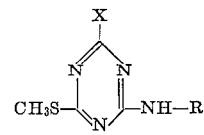

| $R_1$= | $R_2$= | X=Cl; M.P., ° C. | X=$N_3$; M.P., ° C. |
|---|---|---|---|
| (15) methylmercapto | sec.butyl | 39–42 (B.P., 122°, 0.5 mm. Hg) | 69–71, petroleum ether. |
| (16) methylmercapto | β-methoxy-ethyl | 85–87, hexane | 90, methanol. |
| (17) methylmercapto | γ-methoxy-propyl | 68–69, cyclohexane | 59–60, cyclohexane. |
| (18) methylmercapto | β-methylmercaptoethyl | 92–94, cyclohexane | 94–95, alcohol. |
| (19) isopropylmercapto | γ-methoxypropyl | 72–74, hexane | 74–75, methanol. |
| (20) n-butylmercapto | γ-methoxypropyl | 63–65, cyclohexane | 34–36, hexane. |
| (21) sec.butylmercapto | γ-methoxypropyl | 58–60, petroleum ether | 52–53, petroleum ether. |

(22) In the same manner, using as starting material 2,4-dichloro - 6 - methylmercapto-1,3,5-triazine, there was obtained via the intermediately formed 2-chloro-4-diethylamino-6-methylmercapto-1,3,5-triazine (from petroleum ether, M.P. 53–55° C.) the 2 - azido-4-diethylamino-6-methylmercapto-1,3,5-triazine; this compound was liquid and displayed in the infrared spectrum a strong band at 4.66μ.

(23) (a) 2-secondary butylmercapto - 4 - chloro-6-isopropylamino-1,3,5-triazine.—107 parts of 2-secondary butylmercapto-4,6-dichloro-1,3,5-triazine were mixed with 750 parts by volume of anhydrous toluene, and 53.2 parts of isopropylamine were gradually stirred in, while cooling with ice to maintain a temperature of about 15° C. The batch was then allowed to react for another 30 minutes at room temperature. The precipitate formed was filtered off, the filtrate evaporated, and the residue distilled in a high vacuum.

2-secondary butylmercapto-4-chloro-6-isopropylamino-1,3,5-triazine was obtained as a highly viscous oil which distilled at 139° C. under a pressure of 0.05 mm. Hg.

(23)(b) 6-(2-secondary butylmercapto - 4 - isopropylamino-triazinyl)-trimethyl ammonium chloride.—A solution of 78 parts of 2-secondary butylmercapto-4-chloro-6-isopropylamino-1,3,5-triazine in anhydrous toluene was

| R= | X=Cl;<br>M.P.,° C. | X=$N_3$;<br>M.P., ° C. |
|---|---|---|
| (24) tert. butyl | B.P., 97–98°, 0.02 mm. Hg. | 59–63, petroleum ether. |
| (25) octadecyl | 58–60, hexane | 79–80, methanol. |
| (26) oleyl | Liquid | Liquid. |
| (27) cyclopropyl | 105–107, toluene | 107–108. |
| (28) cyclopentyl | 42–44 (B.P., 140–145° C,. 0.05 mm. Hg). | 76. |
| (29) cyclohexyl | 110–111, cyclohexane | 112–113, methanol. |
| (30) cyclooctyl | 67–69, hexane | 55. |
| (31) cyclododecyl | 137–139 | 76–78. |
| (32) 8(or 9) tetrahydro-exo-dicyclopentadienyl | 124–125, cyclohexane | Amorphous. |
| (33) β-hydroxyethyl | 125–126, nitrobenzene | 105–109, methanol. |
| (34) β,β-dimethoxyethyl | 90–91, cyclohexane | 88, methanol. |
| (35) β-cyanoethyl | 133–134 | 146–148, aqueous methanol. |
| (36) γ-methoxypropyl | 68–69, cyclohexane | Identical with (17). |

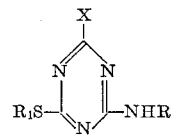

| R₁= | R₂= | X=Cl; M.P., °C. | X=N₃; M.P., °C. |
|---|---|---|---|
| (37) ethyl | isopropyl | B.P., 128°, 0.06 mm. Hg | Liquid. |
| (38) isopropyl | isobutyl | 97–99, hexane | 106–107, methanol. |
| (39) isopropyl | secondary butyl | B.P., 124°, 0.3 mm. Hg | Liquid. |
| (40) n-butyl | isopropyl | B.P., 123°, 0.1 mm. Hg | 27–33. |
| (41) n-butyl | isobutyl | 58–59, hexane | 60–61, methanol. |
| (42) n-butyl | sec.butyl | B.P., 158–160°, 0.6 mm. Hg | Liquid. |
| (43) isobutyl | isopropyl | B.P., 130, 0.15 mm. Hg | Do. |
| (44) isobutyl | isobutyl | B.P., 143–145°, 0.2 mm. Hg; M.P., 45–47 | 65–66, methanol. |
| (45) isobutyl | sec.butyl | B.P., 135°, 0.2 mm. Hg | Liquid. |
| (46) isobutyl | γ-methoxypropyl | 46–47, B.P., 168–269°, 0.1 mm. Hg | 47–48, aqueous methanol. |
| (47) sec.butyl | isopropyl | 127–128, 0.04 mm. Hg | Liquid. |
| (48) isoamyl | isobutyl | 74–76, hexane | 66–68, methanol. |

(49) 2-azido-4-methylmercapto - 6 - piperidino - 1,3,5-triazine melting at 70° to 72° C., methanol, from 2-chloro-4-methylmarcapto - 6 - piperidino - 1,3,5 - triazine, melting at 81° C., hexane.

(50) 2-azido - 4 - methylmercapto - 6 - morpholino-1,3,5-triazine melting at 98° to 99° C., methanol, from 2-chloro-4-methylmercapto - 6 - morpholino-1,3,5-triazine, melting at 92° C. from cyclohexane.

(51)(a) 2 - ethylamino - 4 - hydrazino - 6 - methylmercapto-1,3,5-triazine.—10.5 parts of hydrazine hydrate and then 8 parts of sodium hydroxide, dissolved in 20 parts of water, were added dropwise at 30° to 50° C. to a solution of 41 parts of 2-ethylamino-4-chloro-6-methylmercapto-1,3,5-triazine in 200 parts by volume of dioxane. The mixture was heated for several hours at 55° C. and then poured into 600 parts of ice water. The crystalline product was filtered off, washed with ice water and twice recrystallized from alcohol; it melted at 150 to 151° C.

(51)(b) 2 - ethylamino - 4 - azido - 6 - methylmercapto-1,3,5-triazine.—A solution of 10 parts of 2-ethylamino - 4 - hydrazino - 6 - methylmercapto - 1,3,5 - triazine in 150 parts by volume of N-hydrochloric acid was mixed at 0° to 5° C. dropwise with a solution of 3.5 parts of sodium nitrite in 10 parts of water. The product precipitated immediately. The resulting 2-ethylamino-4-azido-6-methylmercapto-1,3,5-triazine was filtered off, washed with water and crystallized from methanol; it melted at 116° to 117° C. and was identical with product (9).

(52) 2 - azido - 4 - ethylamino - 6 - methoxy - 1,3,5-triazine.—A solution of 84 parts of 2,4-dichloro-6-methoxy-1,3,5-triazine in 700 parts by volume of toluene was mixed at 5° to 8° C. dropwise with 62 parts of ethylamine of 70% strength. When the mixture gave a neutral reaction, 300 parts of water were added. The organic phase was separated, dried over anhydrous sodium sulfate and evaporated. The residue—2 - ethylamino - 4 - chloro - 6-methoxy-1,3,5-triazine—was crystallized from hexane and melted at 96° to 98° C.

A mixture of 38 parts of 2-ethylamino-4-chloro-6-methoxy-1,3,5-triazine, 50 parts of sodium azide, 150 parts by volume of dioxane and 150 parts of water was stirred for 48 hours at 60° C. 200 parts of water were then added at room temperature, the crystalline product was filtered off and crystallized from methanol; it melted at 116° to 117° C.

The following compounds were manufactured in a similar manner:

(53) 2 - azido - 4 - ethoxy - 6 - ethylamino - 1,3,5-triazine, melting at 98° to 99° from cyclohexane, from 2-ethoxy - 4 - ethylamino - 4 - chloro - 1,3,5 - triazine melting at 90° to 91° C., from hexane.

(54) 2 - azido - 4 - isopropylamino - 6 - methoxy-1,3,5-triazine.—A stirred solution of 270 parts of 2,4-dichloro-6-methoxy-1,3,5-triazine in 1500 parts by volume of toluene was mixed dropwise with 89 parts of isopropylamine and then with 360 parts of sodium hydroxide solution (prepared from 60 parts of sodium hydroxide and 300 parts of water). By cooling with ice the temperature was maintained below 20° C. The mixture was then stirred at about 20° C. until a neutral reaction materialized. The organic phase was separated, dried over anhydrous sodium sulfate, filtered and evaporated. The residue was crystallized from hexane and melted at 65° to 66° C.; it was 2-chloro-4-isopropylamino-6-methoxy-1,3,5-triazine.

A solution of 101 parts of 2-chloro-4-isopropylamino-6-methoxy-1,3,5-triazine in 1500 parts by volume of anhydrous toluene was mixed at +5° C. dropwise with 175 parts of a 4-molar toluol solution of trimethylamine. The mixture was then kept for about 14 hours at room temperature. The precipitated quaternary salt was filtered off, washed with anhydrous toluene and dried in a high vacuum at room temperature.

30 parts of 6 - (2 - isopropylamino - 4 - methoxy-1,3,5-triazinyl) trimethyl ammonium chloride were dissolved in 200 parts of water, and 20 parts of sodium azide were stirred into the solution. The product settled out immediately. The mixture was heated to 55° C. and then left to cool. The resulting 2-azido - 4 - isopropylamino-6-methoxy 1,3,5-triazine was filtered off, washed with water and recrystallized from aqueous methanol; it melted at 125° to 128° C.

The following compounds were manufactured in a similar manner

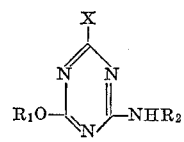

| R₁= | R₂= | X=Cl; M.P., °C. | X=N₃; M.P., °C. |
|---|---|---|---|
| (55) methyl | n-propyl | 64–65, hexane | 73–74, aqueous methanol. |
| (56) methyl | allyl | 73–74, hexane | 102–103, methanol. |
| (57) methyl | n-butyl | 53–55 (B.P., 114–116, 0.1 mm. Hg) | 63–64, aqueous methanol. |
| (58) methyl | isobutyl | 98–99, hexane | 67–69, aqueous methanol. |
| (59) methyl | sec. butyl | (B.P., 109–112, 0.3 mm. Hg) | 65–66, aqueous methanol. |
| (60) methyl | γ-methoxypropyl | 63–64, hexane | 55–56, hexane. |
| (61) methyl | α,Δ-dimethylpentyl | B.P. 138–140, 0.3 mm. Hg | Liquid, highly viscous. |
| (62) methyl | cyclohexyl | 100–101, cyclohexane | 131–132, methanol. |
| (63) n-propyl | methyl | 103–104, cyclohexane | 92–94, methanol. |
| (64) n-propyl | ethyl | 64–65 (B.P., 116–120, 0.2 mm. Hg) | 76–77, methanol. |
| (65) n-propyl | n-propyl | 51–55 (B.P., 132–135, 0.25 mm. Hg) | 61–63, methanol. |
| (66) n-propyl | isopropyl | B.P., 124–128, 0.45 mm. Hg | 96–97, methanol. |
| (67) n-propyl | isobutyl | B.P., 146–150, 0.5 mm. Hg | 77–78, methanol. |
| (68) n-propyl | sec. butyl | B.P., 130–133, 0.45 mm. Hg | 40–41, methanol. |
| (69) n-propyl | tert. butyl | B.P., 118–123, 0.45 mm. Hg | Liquid, highly viscous. |

| $R_1=$ | $R_2=$ | X=Cl; M.P., °C. | X=$N_3$; M.P., °C. |
|---|---|---|---|
| (70) isopropyl | ethyl | 80–81, hexane | 83–85, methanol. |
| (71) isopropyl | n-propyl | 71–72, hexane | 73–75, methanol. |
| (72) isopropyl | isopropyl | 85–86, hexane | 57–58, methanol. |
| (73) isopropyl | n-butyl | 73–75, hexane | 64–65, methanol. |
| (74) isopropyl | isobutyl | 93–95, hexane | 99–100, methanol. |
| (75) isopropyl | sec. butyl | 66–68, hexane | 91–92, methanol. |
| (76) allyl | ethyl | 63–64, hexane | 70–71, methanol. |
| (77) isopropyl | n-propyl | 49–51 (B.P., 142, 0.7 mm. Hg) | 58–59, methanol. |
| (78) allyl | isopropyl | B.P., 107–110, 0.2 mm. Hg | 62–63, methanol. |
| (79) allyl | allyl | 42–43 (B.P., 121–128, 0.2 mm. Hg) | 62–63, methanol. |
| (80) allyl | isobutyl | B.P., 128–132, 0.1 mm. Hg | 64–65, methanol. |
| (81) allyl | sec. butyl | B.P., 118–120, 0.2 mm. Hg | 47–48, methanol. |
| (82) n-butyl | ethyl | 65–68 (B.P., 122–124, 0.2 mm. Hg) | 69–70, methanol. |
| (83) n-butyl | n-propyl | 39–41 (B.P. 132–135, 0.07 mm. Hg) | 54–55, methanol. |
| (84) n-butyl | allyl | 66–67 (B.P. 132–135, 0.28 mm. Hg) | 64–65, methanol. |
| (85) n-butyl | isobutyl | 45–46 (B.P. 148–152, 0.5 mm. Hg) | 76–77, methanol. |
| (86) n-butyl | sec. butyl | 50–52 (B.P., 140, 0.3 mm. Hg) | 61–62, methanol. |
| (87) n-butyl | tert. butyl | B.P., 134–136, 0.35 mm. Hg | Liquid. |
| (88) isobutyl | isobutyl | 64–65 (B.P. 132–135, 0.3 mm. Hg) | 70–72, methanol. |
| (89) isobutyl | sec. butyl | B.P. 117–119, 0.1 mm. Hg | 59–60, methanol. |
| (90) β-methoxy-ethyl | isopropyl | B.P. 121, 0.04 mm. Hg | 78–80, methanol. |

(91) 2 - azido - 4 - dimethylamino - 6 - isopropoxy-1,3,5-triazine melting at 80° to 82° C. (methanol) from 2 - chloro - 4 - dimethylamino - 6 - isopropoxy - 1,3,5-triazine melting at 105° to 107° C. (hexane).

(92) 2 - azido - 4 - cyclohexylamino - 6 - methoxy-1,3,5-triazine.—A solution of 72.8 parts of 2-chloro-4-cyclohexylamino-6-methoxy-1,3,5-triazine in 400 parts by volume of dioxane was mixed portionwise with 15.2 parts of hydrazine hydrate and then with a solution of 12 parts of sodium hydroxide in 50 parts of water, while cooling the mixture to maintain a maximum temperature of 35° C. and the batch was then stirred for another 14 hours at room temperature, diluted with 500 parts by volume of chloroform and repeatedly washed with water. The solution was dried over anhydrous sodium sulfate, filtered and evaporated. The residue was amorphous 2-cyclohexyl-amino-4-hydrazino-6-methoxy-1,3,5-triazine.

23.8 parts of crude 2-cyclohexylamino-4-hydrazino-6-methoxy-1,3,5-triazine were dissolved in 220 parts of about normal hydrochloric acid. At about 0° C. a solution of 6.9 parts of sodium nitrite in 50 parts of water was added dropwise until potassium iodide-starch paper was turned blue by a specimen.

The precipitated product was filtered off, washed with water and crystallized from methanol; it was identical with the compound obtained as described under (62).

(93) 2 - ethylamino - 4,6 - diazido - 1,3,5 - triazine.— A solution of 18.4 parts of cyanuric chloride in 70 parts by volume of acetone was added dropwise, while being well stirred, to a solution of 20 parts of sodium azide in 125 parts of water at 0° to 5° C., whereupon the mixture was stirred for a short time. A specimen of the crystalline product was filtered off and crystallized from alcohol; it melted at 94° to 95° C.

The resulting dispersion of 2-chloro-4,6-diazido-1,3,5-triazine was dissolved in 200 parts by volume of toluene; this solution was mixed with 6.8 parts of aqueous ethylamine of 70% strength and stirred at 40° to 50° C. During 30 minutes, 50 parts of 2 N-sodium hydroxide solution were stirred in portionwise at 40° to 50° C., and the batch was allowed to cool, while being stirred. The organic phase was separated, dried over anhydrous sodium sulfate, filtered and evaporated. The residue crystallized from methanol or cyclohexane; it melted at 122° to 124° C.

Instead of sodium hydroxide solution, there could have been used an equivalent quantity of ethylamino as hydrochloric acid acceptors; in this case the batch would have been allowed to react at 40° C., until only a small proportion of free amine remained.

The 2 - alkylamino - 4,6 - diazido - 1,3,5 - triazines listed in the following table were manufactured in a similar manner:

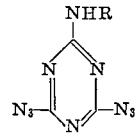

| R= | Melting at ° C. |
|---|---|
| (94) methyl | 167–168 (methanol). |
| (95) n-propyl | 134 (methanol). |
| (96) isopropyl | 123–124 (methanol). |
| (97) allyl | 114–115 (methanol). |
| (98) n-butyl | 121–122 (methanol). |
| (99) isobutyl | 115–116 (methanol). |
| (100) tert.-butyl | 69–70 (petroleum ether). |
| (101) n-hexyl | 77 (methanol). |
| (102) β-methoxyethyl | 118 (methanol). |
| (103) γ-methoxypropyl | 78–79 (methanol). |
| (104) cyclohexyl | 137–138 (methanol). |

Further manufactured were the following compounds:

(105) 2 - diethylamino - 4,6 - diazido - 1,3,5 - triazine, melting at 44° to 47° C. (cyclohexane).

(106) 2,4 - diazido - 6 -morpholino - 1,3,5 - triazine, melting at 118° to 119° C. (acetone).

(107) 2,4 - diazido-6-(β-methylmercapto-ethylamino)- 1,3,5 - triazine.—2,4 - dichloro - 6 - (β - methylmercapto-ethylamino)-1,3,5-triazine can be prepared by the method of J. T. Thurston et al. (J. Amer. Chem. Soc. 73, p. 2981 (1963) from cyanuric chloride and β-methyl-mercapto-ethylamine. It melts at 75° to 77° C. (from xylene-cyclohexane).

35.9 parts of 2,4-dichloro-6-(β-methylmercapto-ethylamino)-1,3,5-triazine were mixed with 60 parts by volume of acetone, 30 parts of sodium azide and 30 parts of water and the whole was stirred for 24 hours at 60° C. and then allowed to cool, whereupon 100 parts of water were added. The crystalline product was filtered off, washed with water and crystallized from methanol; it melted at 95° to 96° C.

(108) In an analogous manner 2,4-diazido-6-sec.butyl-amino-1,3,5-triazine was prepared from 2,4-dichloro-6-sec.butylamino-1,3,5-triazine. The product crystallized at a low temperature.

(109) In an analogous manner 2-ethylamino-4,6-dichloro-1,3,5 - triazine yielded 2 - ethylamino-4,6-diazido-1,3,5-triazine: it is identical with the product No. 93, obtained from 2,4-diazido-6-chloro-1,3,5-triazine and ethylamine.

(110) 2-azido-4,6-dimethylmercapto-1,3,5-triazine.—A mixture of 75 parts of methylmercaptan and 107 parts of 2,6-lutidine was added portionwise at 0° to 5° C. to a solution of 196 parts of 2,4-dichloro-6-methylmercapto-1,3,5-triazine in 1,000 parts by volume of acetone. The mixture was kept for 2 hours at room temperature, then for 14 hours at 50° C., filtered and evaporated. The residue was taken up in 1,000 parts by volume of toluene, washed with 2×150 parts of ice water, dried over anhydrous sodium sulfate, filtered and evaporated. The resulting crude 2-chloro-4,6-dimethylmercapto-1,3,5-triazine was crystallized from hexane and melted at 84° to 86° C.

21 parts of 2-chloro-4,6-dimethylmercapto-1,3,5-triazine, 15 parts of sodium azide, 75 parts by volume of acetone and 50 parts of water were stirred for 24 hours at 60° C. The mixture was then mixed with 200 parts of water. The crystalline product was filtered off, washed with water and crystallized from acetone: it melted at 117° to 118° C.

As described above, 196 parts each of 2,4-dichloro-6-methylmercapto-1,3,5-triazine were reacted with the following amounts of mercaptans and alcohols:

140 parts of isobutylmercaptan
50 parts of methanol
100 parts of isobutanol.

The resulting 2-alkylmercapto- and 2-alkoxy-4-methylmercapto-6-chlorotriazines respectively were reacted with sodium azide as described above to give rise to the following compounds

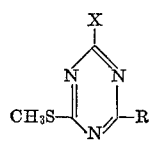

| R= | X=Cl, M.P.,° C. | X=N₃; P.M.,° C. |
|---|---|---|
| (111) isobutylmercapto. | B.P., 128-130, 0.4 mm. Hg. | Liquid. |
| (112) methoxy | 76-77 (B.P., 125-128, 0.5 mm. Hg). | 70-71, methanol. |
| (113) isobutoxy | 28-30 (B.P., 135-137, 1.5 mm. Hg). | Liquid. |

(114) 2,4-diazido-6-methoxy-1,3,5-triazine.—A solution of 36 parts of 2,4-dichloro-6-methoxy-1,3,5-triazine in 70 ml. of dioxane was stirred dropwise at about 0° C. into 39 parts of sodium azide in 150 parts of water, and the mixture was then stirred for 30 minutes at about 20° C. The oil which had settled out was taken up in 200 parts by volume of benzene, dried and filtered. The filtrate was evaporated in a water-jet vacuum at room temperature and diluted with 100 parts by volume of methanol. The product, melting at 58° to 59° C., crystallized out at 0° C.

The following compound was manufactured in a similar manner from 2,4-dichloro-6-methylmercapto-1,3,5-triazine:

(115) 2,4 - diazido-6-methylmercapto - 1,3,5 - triazine which can be crystallized from cyclohexane and melts at 51–53° C.

(116) 2,4-diazido-6-isobutoxy-1,3,5-triazine.—A mixture of 20 parts of 2,4-dichloro-6-isobutoxy-1,3,5-triazine 20 parts of sodium azide and 50 parts by volume of acetone was stirred and mixed with 50 parts of water, whereupon the batch spontaneously heated up to 60° C. The mixture was then further stirred for 14 hours at room temperature.

The product was taken up in 100 parts by volume of toluene and washed twice with water. The solution was evaporated under vacuum at a maximum temperature of 50° C. The residue was pure, liquid 2,4-diazido-6-isobutoxy-1,3,5-triazine.

In a similar manner the following diazides, which are liquid at room temperature, were manufactured from the corresponding 2-alkoxy- and 2-alkylmercapto-4,6-dichloro-1,3,5-triazines:

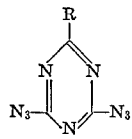

R=
(117) n-propoxy
(118) isopropoxy
(119) allyloxy
(120) propargyloxy
(121) γ-chloropropoxy
(122) n-butoxy
(123) n-octyloxy
(124) cyclohexyloxy
(125) 2-methyl-Δ⁴-cyclohexenyl-methyloxy
(126) n-propylmercapto
(127) isopropylmercapto
(128) n-butylmercapto
(129) isobutylmercapto
(130) allylmercapto Manufacturing the 2,4 - dichloro - 6 - (2'-methyl-Δ-4'-cyclohexenyl-methyloxy)-1,3,5-triazine required for making the compound No. 125.

A mixture of 200 parts of 2-methyl-Δ4-cyclohexenyl-methanol and 107 parts of 2,6-lutidine was dropped at 0° C. into a solution of 184 parts of cyanuric chloride in 1000 parts by volume of acetone. The mixture was heated for 14 hours at 50° C., then cooled, filtered and evaporated. The residue was dissolved in toluene and washed with ice water. The solution was dried over anhydrous sodium sulfate and evaporated. The liquid product was distilled. It boiled at about 140° C. under a pressure of 0.2 mm. Hg.

EXAMPLE 2

In each experiment, 10 parts of one of the compounds of Example 1 were mixed with 20 parts of dimethylformamide and 10 parts of a condensation product from an anionic surface-active compound (preferably the calcium or magnesium salt of monolauryl benzene monosulfonic acid) with a nonionic surface-active compound (preferably a polyethyleneglycol ether of the monolauryl ester of sorbic acid) and then diluted with xylene to 100 cc. The resulting clear solution was suitable for use as a spray broth concentrate and could be emulsified by being poured into water.

EXAMPLE 3

(A) In a greenhouse, earthenware pots were filled within earth and the following plants were seeded in them: *Avena sativa, Setaria italica, Sinapis arvensis* and *Lepidium sativum*.

The pre-emergence treatment was carried out 1 day after seeding with spray broths prepared according to Example 2, which contained as active substance the compound No. 9 of Example 1. The amount applied corresponded to 10 kg. of active substance per hectare. Evaluation of the results was carried out 20 days after the treatment.

The post-emergence treatment of the plants mentioned above was carried out in a similar manner, but only 10 days after seeding, when 2 to 3 leaves had appeared.

The amount applied corresponded to 5 kg. of active substance per hectare. Evaluation of the results was carried out 20 days after the treatment. The results are summarized in the following table.

| Plant tested | Pre-emergence treatment | Post-emergence treatment |
|---|---|---|
| *Avena sativa* | 10 | 10 |
| *Setaria italica* | 9 | 10 |
| *Sinapis arvensis* | 10 | 9 |
| *Lepidium sativum* | 10 | 10 | where 0 indicates no effect, 10 means plants completely destroyed.

(B) In the greenhouse, earthenware pots were filled with earth and the seeds of the plants listed in the table below were seed in them.

The pre-emergence treatment was carried out 1 day after seeding with the spray broths prepared according to Example 2, containing as active substance the compound No. 12 of Example 1. Amount applied: 4 kg. per hectare. Evaluation was carried out 20 days after the treatment.

The post-emergence treatment of the plants mentioned was carried out in identical manner, but only 10 days after seeding when 2 to 3 leaves had appeared. The amount applied corresponded to 4 kg. of active substances per hectare. Evaluation was carried out 20 days after the treatment. The results are summarized in the following table.

| Plant tested | Pre-emergence treatment | Post-emergence treatment |
| --- | --- | --- |
| Triticum | 9 | 9 |
| Hordeum | 10 | 8 |
| Sorghum sudanense | 9 | 9 |
| Panicum crus galli | 10 | 10 |
| Poa trivialis | 10 | 10 |
| Dactylis glomerata | 10 | 10 |
| Allium cepa | 10 | 10 |
| Beta vulgaris | 10 | 10 |
| Calendula chrysantha | 10 | 10 |
| Linum usitatissimum | 10 | 10 |
| Brassica rapa | 10 | 10 |
| Daucus carota | 10 | 10 |
| Lactuca sativa | 10 | 10 |
| Medicago sativa | 10 | 10 |
| Soja max | 8 | 10 |
| Phaseolus vulgaris | 7 | 9 | where O indicates no effect, 10 means plants completely destroyed.

Under the test conditions described under (A) and (B), good to very good herbicidal effects were obtained with the compounds Nos. 1, 3, 4, 5, 9, 11, 13 to 17, 24, 53, 54, 96, 98 to 101, 104, 105 and 115 of Example 1.

When used for the post-emergence treatment, a selective action against dicotyldons was observed, for example, with the compounds Nos. 126 to 129 of Example 1.

EXAMPLE 4

The compounds Nos. 1, 3, 10 and 115 of Example 1 displayed a good microbicidal effect, for example against phytopathogenic fungi. Thus, in a concentration of 0.2% of active substance a 100% effect against Septoria apii on celery was recorded, and the plants treated did not suffer any appreciable damage.

EXAMPLE 5

2 parts of the following compounds were dissolved in 100 parts each of freshly distilled styrene:

2,4-diazido-6-n-propoxy-1,3,5-triazine,
2,4-diazido-6-n-propylmercapto-1,3,5-triazine and
2-ethylamino-4,6-diazido-1,3,5-triazine.

A fourth styrene specimen was not given any additive. All test specimens were maintained at 110° C. After 4 hours and 15 minutes the mixtures containing one of the above compounds had solidified to jellies, whereas the blank test specimen was still liquid.

What is claimed is:

1. A herbicidally active preparation consisting essentially of (a) as the active principal thereof, a herbicidally effective amount of a compound of the formula

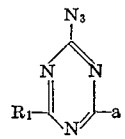

wherein $R_1$ is a member selected from the group consisting of the group

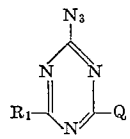

and $-N_3$

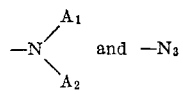

wherein $A_1$ is lower alkyl, or lower alkoxy lower alkyl wherein the alkyl moieties contain from 1 to 6 carbon atoms, and cyclohexyl, and $A_2$ is hydrogen, or lower alkyl of 1 to 6 carbon atoms, and Q is selected from the group consisting of chloro, lower alkylthio, lower alkoxy and azido, wherein the lower alkyl moieties contain from 1 to 5 carbon atoms, provided that $R_1$ and Q are always different, and (b) a carrier therefor.

2. A herbicidal composition according to claim 1, wherein the active principal is a compound of the formula

wherein Q is lower alkyl thio.

3. A preparation according to claim 2 wherein $R_1$ is lower alkylamino.

4. A composition according to claim 2 wherein $R_1$ is azido.

5. A composition according to claim 1 wherein Q is azido and $R_1$ is $$-N\begin{matrix}A_1\\A_2\end{matrix}$$

6. A composition according to claim 1 wherein Q is lower alkoxy.

7. A preparation as claimed in claim 1 comprising
(a) as active principal a herbicidal amount of the compound of the formula

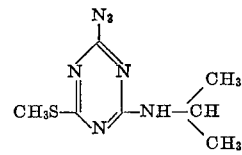

and (b) a carrier therefor.

8. A preparation as claimed in claim 1 comprising
(a) as active principal a herbicidal amount of the compound of the formula

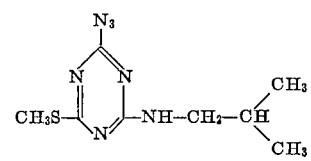

and (b) a carrier therefor.

9. A preparation as claimed in claim 1 comprising
(a) as active principal a herbicidal amount of the compound of the formula

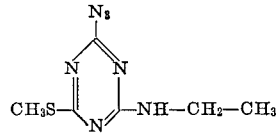

and (b) a carrier therefor.

10. The method for combating weeds, wherein there is applied to the area whereon the said effect is desired, a herbicidal amount of a compound of the formula set forth in claim 1.

References Cited

UNITED STATES PATENTS

| | | | |
|---|---|---|---|
| 3,305,348 | 2/1967 | Schwarze et al. | 71—86 |
| 3,326,913 | 6/1967 | Schulz et al. | 71—86 |

FOREIGN PATENTS

| | | |
|---|---|---|
| 202,151 | 2/1959 | Austria. |
| 204,837 | 8/1959 | Austria. |
| 656,233 | 5/1965 | Belgium. |
| 1,436,177 | 3/1966 | France. |

OTHER REFERENCES

Deutsche Gold und Silber II, "Preparation of diamino azidotriazine" (1964) CA62, p. 16275 (1965).

Deutsche Gold und Silber I, 2-(10-nitrosoamino)-4-amino-s-triazines (1965) CA65, p. 2280 (1966).

LEWIS GOTTS, Primary Examiner

G. HOLLRAH, Assistant Examiner

U.S. Cl. X.R.

71—72, 74, 88, 92; 260—247, 247.1, 247.7; 424—248, 249

PO-1050
(5/69)

UNITED STATES PATENT OFFICE
CERTIFICATE OF CORRECTION

Patent No. 3,499,749                    Dated March 10, 1970

Inventor(s) ERWIN NIKLES ET AL

It is certified that error appears in the above-identified patent and that said Letters Patent are hereby corrected as shown below:

Column 16, claim 2, the lower right hand side of the formula should read:

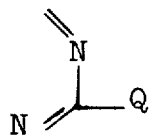

Signed and sealed this 6th day of April 1971.

(SEAL)
Attest:

EDWARD M. FLETCHER, JR.                WILLIAM E. SCHUYLER, JR.
Attesting Officer                      Commissioner of Patents